Figure 1:
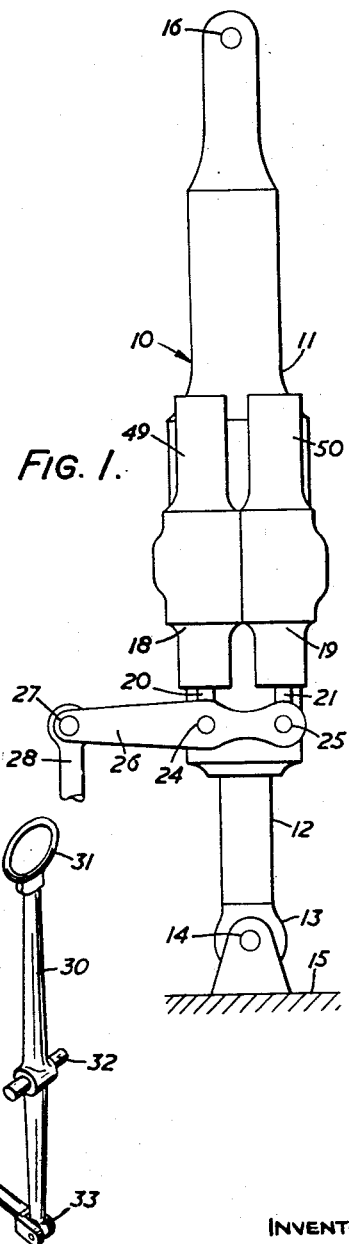

Oct. 18, 1960　　　　J. L. FOWLER　　　　2,956,408
HYDRAULIC FLYING CONTROL SYSTEMS FOR AIRCRAFT
Filed March 31, 1958　　　　　　　　　　4 Sheets-Sheet 1

INVENTOR
JOHN L. FOWLER

ATTORNEY

Oct. 18, 1960     J. L. FOWLER     2,956,408
HYDRAULIC FLYING CONTROL SYSTEMS FOR AIRCRAFT
Filed March 31, 1958     4 Sheets-Sheet 2

INVENTOR
JOHN L. FOWLER

ATTORNEY

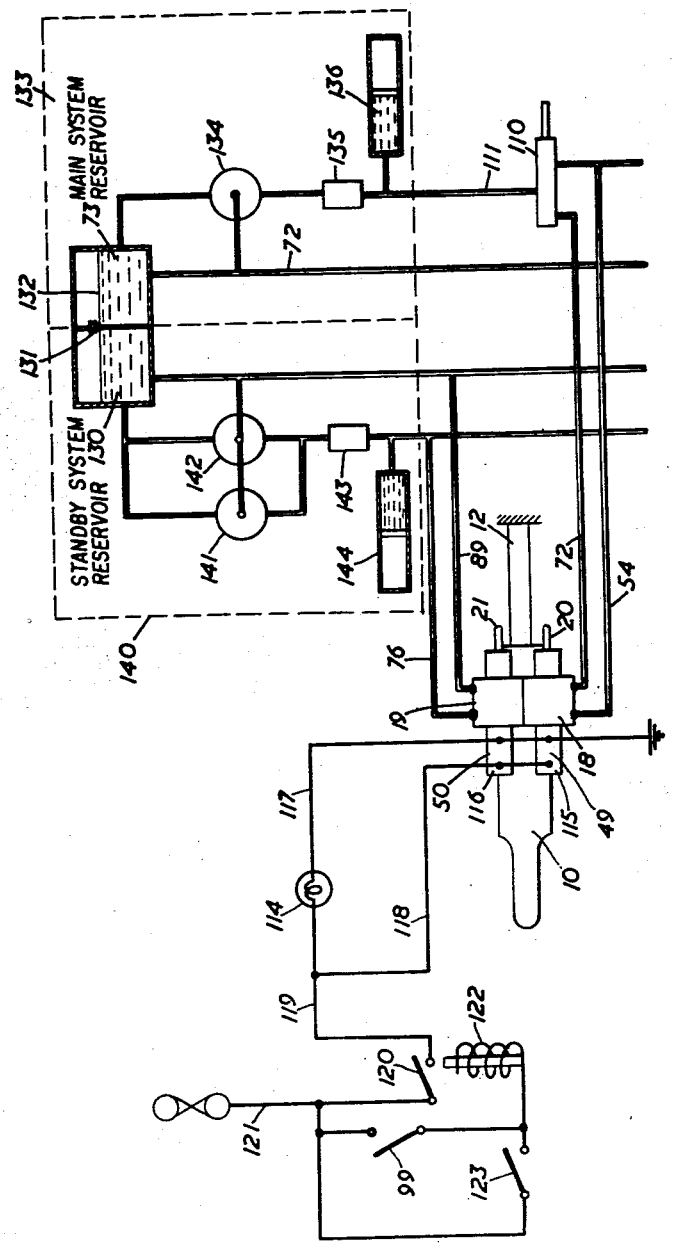

United States Patent Office 2,956,408
Patented Oct. 18, 1960

2,956,408

HYDRAULIC FLYING CONTROL SYSTEMS FOR AIRCRAFT

John Lawrence Fowler, Hayes, England, assignor, by mesne assignments, to Fairey Aviation Limited, Hayes, England, a company of Great Britain Filed Mar. 31, 1958, Ser. No. 725,271

Claims priority, application Great Britain Apr. 2, 1957

17 Claims. (Cl. 60—97)

This invention relates to hydraulic-powered control systems for aircraft flying controls, in which the flying control members such as ailerons, elevators, flaps and rudders, are actuated by hydraulic jacks.

A consideration in the design of such systems is the degree of duplication needed to ensure reliability and safety. The present tendency is to duplicate all major elements irrespective of their individual reliability factors. However in certain cases this policy may involve the unnecessary duplication of elements which are inherently highly reliable, thereby needlessly complicating the apparatus and in some cases introducing serious complementary problems liable to reduce the overall reliability of the system.

Whilst it is necessary to duplicate pressure systems to guard against possible failure of hydraulic pressure in a single system, and whilst mechanical failure of a servo value due to breakage or seizure should also be allowed for by duplication, the applicant's experience is that failure of a hydraulic jack is so extremely unlikely that this element may be regarded as virtually completely reliable from the practical point of view. Moreover in cases where duplicated hydraulic jacks are provided for each flying control member, arranged to be operated simultantneously from the duplicated pressure systems through their associated servo valves, the risk of pressure intensification in the jack cylinders due to mismatching of the valve overlaps, and also the risk that the seizure of one of the valves may render the other valve inoperative, may tend to militate against reliability.

According to the present invention, in a hydraulic-powered aircraft flying control system in which a flying control member is actuated by hydraulic motor means arranged to be supplied from either of two alternative hydraulic pressure systems, referred to respectively as the main system and the standby system, through two hydraulic servo valves referred to respectively as the main valve and the standby valve and respectively associated with the two pressure systems, a common control mechanism is provided which is capable of being operatively connected alternatively to either of the two servo valves for operation of that valve, and means is provided for automatically transferring the operative connection of the mechanism from the main valve to the standby valve on failure of the main hydraulic pressure supply to the main valve.

Thus the invention whilst satisfying the normal requirement for duplicated pressure systems and duplicated servo valves, enables the flying control member to be actuated either by a single hydraulic jack supplied alternatively from the two pressure systems, or by two jacks or a twin-cylinder tandem jack unit, only one of the duplicated pressure systems being called on at a given time to actuate a single jack or jack cylinder.

The invention enables even an overall gain in reliability to be attained in certain circumstances by eliminating the necessity for providing the usual "fail-safe" devices associated with a completely duplicated installation having duplicate jacks both of which are energised simultaneously from the two pressure systems. Moreover in the known arrangements in which both jacks work simultaneously, the associated structure should be stressed to take twice the design load of each jack when in normal operation, or alternatively each jack or jack cylinder must be restricted to half its design performance. These disadvantages apply both to tandem jacks and to separate jack units when called on to work simultaneously in the manner known previously, but may be avoided by the employment of a system according to the present invention in which only one jack or jack cylinder is required to be supplied and worked at a given instant.

In one form of the present invention the common control mechanism by which the main and standby servo valves are alternatively operated comprises a linkage which includes an input lever pivoted to the operating members of both servo valves at points spaced apart along its length and also pivoted at a third point of its length to the linkage, the lever being arranged to pivot about a fulcrum afforded by its pivotal connection to the standby servo valve so as to operate the main valve in response to movements of the linkage when the main pressure system is selected, and vice versa.

In order to reduce lost motion in operation of the servo valves, each servo valve may be provided with a lock arranged when actuated to lock the valve positively in a closed position, the lock associated with the main valve normally remaining released whilst that associated with the standby valve is normally locked, but in the event of failure of the main system the lock associated with the standby valve being automatically released and that associated with the main valve being automatically locked. By this means each valve when locked provides a firm fulcrum for the operation of the other, released valve by the pivoted input lever in response to movements of the pilot's manual control mechanism.

For example, the lock associated with each servo valve may be a hydraulic-pressure-actuated lock, that associated with the standby valve being normally held locked by the pressure of the main system but being arranged to be automatically released on failure of the main system pressure, whilst the lock associated with the main valve normally remains released but on failure of the main system is automatically locked and held locked by the pressure of the standby system.

According to a further feature of the invention there may also be provided hydraulic-pressure-responsive changeover valve means normally pressure-biased to one operative position in which it isolates the standby servo valve from the jack means, but arranged to move automatically into an alternative operative position, in which it establishes connection between the standby valve and the jack means but isolates the main valve from the jack system, when the pressure in the main system falls below a predetermined value. Each servo valve when non-operative is thus wholly isolated from the jack means by the changeover valve means, thereby preventing any undesirable interaction between the two valves and their associated fluid systems. This arrangement thus avoids the necessity for correlating the valve overlap and the neutral or closed positions of the two valves. Moreover as the changeover valve means is pressure responsive, its action is entirely automatic and positive in the event of pressure failure in the main system.

The pressure-responsive change-over valve means may also be arranged to release the normally locked lock associated with the standby valve and to lock the normally released lock associated with the main servo valve, on changing over from its normal operative position to its alternative operative position, and vice versa.

Alternatively or in addition there may be provided solenoid-actuated electro-hydraulic valve means arranged when energised to release the normally locked hydraulic lock associated with the standby servo valve and to lock the normally released hydraulic lock associated with the main servo valve. Conveniently these solenoid-actuated valve means may be energised automatically in response to the change-over movement of the pressure-responsive change-over valve means into its standby valve position. A manual control switch may also be provided in the pilot's cockpit for energising the solenoid-actuated valve means at will. Alternatively or in addition, a switch operated automatically by movement of the common control mechanism leading to the servo valves may be provided for energising the solenoid-actuated valve means in the event of servo valve seizure.

A hydraulic selector control arranged when operated to reduce the main supply pressure at the servo valve to less than the critical value required to cause the change-over movement of the pressure-responsive change-over valve means, may be provided at a convenient point in the aricraft cockpit. This hydraulic control enables the change-over to be effected at will from one pressure system to the other, at the same time isolating the non-operative valve from the jack. It will be noted that this hydraulic control would enable the change-over to be effected manually even if the electric supply controlling the solenoid-actuated valves referred to above had failed.

As mentioned above, the hydraulic motor means which actuates the flying control member may take the form of a single hydraulic jack arranged to be supplied alternatively from the main and standby systems through the associated servo valves, thereby avoiding needless duplication of the inherently reliable jack unit and also avoiding difficulties such as pressure intensification which as mentioned above are liable to arise if duplicated jacks are provided both of which are actuated simultaneously.

In certain cases however, for example in order to meet specific regulations or customer requirements, the provision of duplicate jacks, or at least duplicate jack cylinders in a tandem jack arrangement may be called for in order that a standby hydraulic jack piston and cylinder shall be available in case of need. This requirement may be met in systems constructed in accordance with the present invention by the provision of a pair of hydraulic jacks both connected to the flying control member, the two jacks being respectively connected to the two pressure systems through the two valves and being actuated thereby alternatively. Again, a tandem jack may be used having two jack cylinders arranged in tandem in a single jack casing, both cylinders acting on a single common jack plunger, and the two jack cylinders being respectively connected through the two valves through the two pressure systems and being actuated alternatively thereby.

Where a tandem jack construction is employed, it is necessary to ensure that when one jack chamber is in use, the other jack chamber which is not operative does not become hydraulically jammed owing to the closure of its supply and drainage ports when it is isolated from its associated servo valve, with resultant jamming of the common plunger of the tandem jack. Accordingly a further feature of the present invention comprises the provision for each jack chamber of a hydraulic by-pass passage capable of being connected in parallel across the jack piston, for example by the pressure-responsive change-over means to obtain equalised pressures on both sides of the jack piston so long as that jack chamber remains inoperative and so as to allow the free movement of the common moving member of the tandem jack under the actuation of the other jack chamber.

If two separate jack units are employed instead of a tandem jack, a hydraulic by-pass may be supplied for each jack unit, or alternatively a mechanical lost-motion connection may be provided between the jacks and the flying control to ensure that either jack may be moved to operate the flying control independently of the other jack.

Figure 2:
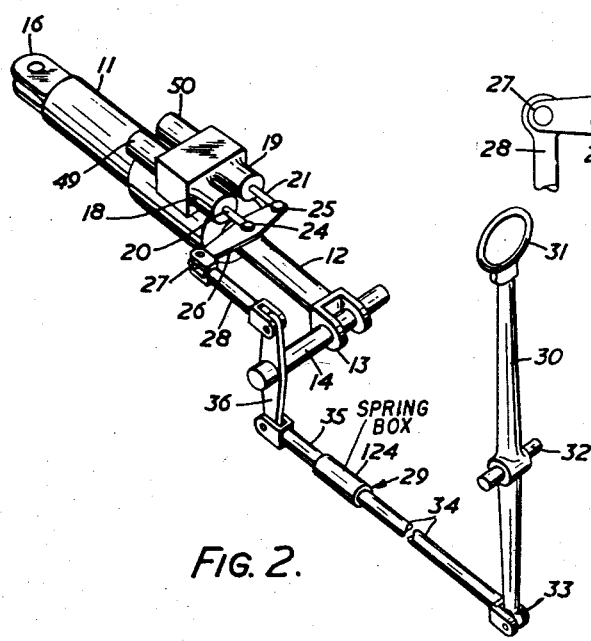
Figure 3:
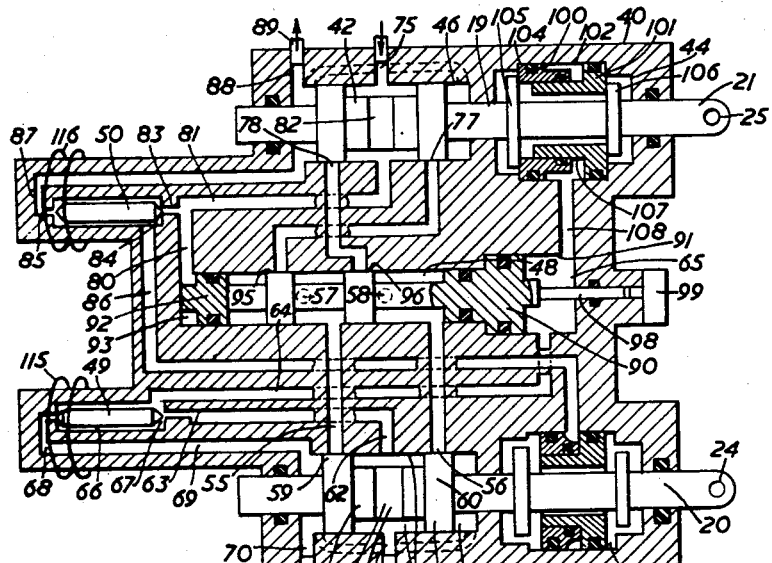
Figure 6:
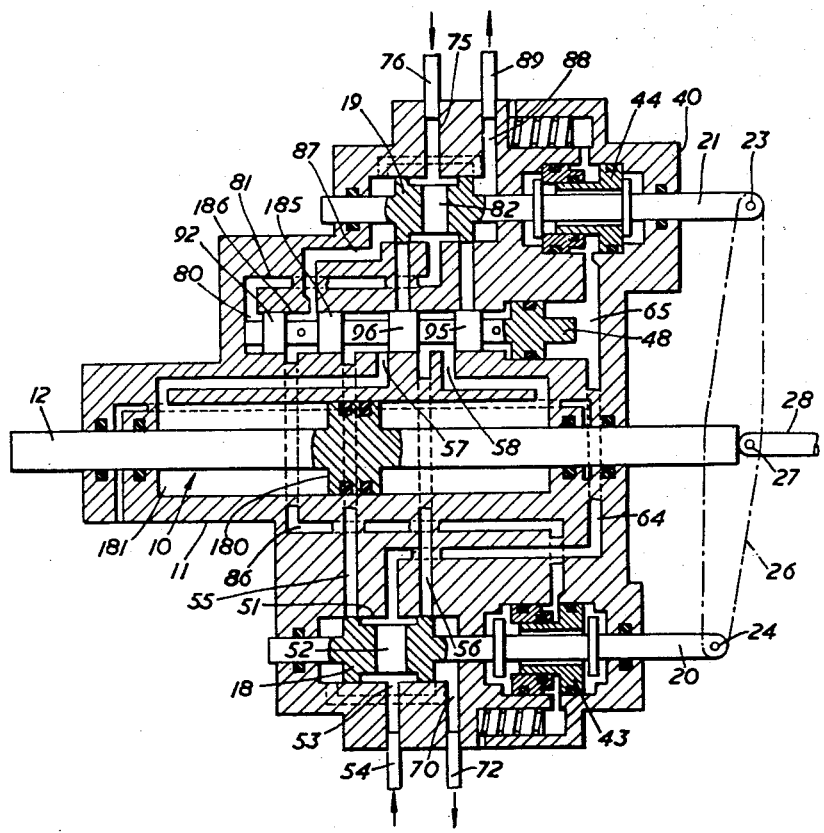

The invention may be carried into practice in various ways, but three specific embodiments will now be described by way of example with reference to the accompanying drawings, in which Figure 1 is a view of a hydraulic jack actuator assembly for actuating a flying control surface of an aircraft, Figure 2 is a perspective view of the manual control linkage for operating alternatively the two servo valves of the jack actuator assembly of Figure 1, Figure 3 is a diagram showing the arrangement of the duplicated servo valve units of the jack actuator assembly of Figure 1, Figure 4 is a diagram illustrating the hydraulic and electrical control circuits associated with the actuator assembly of Figure 1, Figrue 5 is a view similar to Figure 3 of a modified form of jack actuator assembly employing a tandem jack unit, and Figure 6 is a view similar to Figure 3 of a second modified form of jack actuator assembly employing a single jack unit without any electrically operated valves.

The embodiment illustrated in Figures 1 to 4 comprises a fully-powered flying control installation for a civil aircraft, which in this case comprises a helicopter, each flying control member or surface being actuated by a single hydraulic jack actuator assembly provided with two alternative servo valves by means of which the jack can be operated alternatively from either of two separate hydraulic pressure fluid supply systems in response to movement of the pilot's manual control linkage.

The jack actuator assembly associated with one of the flying control members is illustrated at 10 in Figure 1. The single jack unit 10 consists of a jack body 11 containing a single cylinder, and a single double-acting plunger whose end 13 is anchored by means of a pin 14 to a fixed part 15 of the aircraft in the usual way, whilst the jack body 11 is mechanically coupled at its other end 16 to the flying control member to be actuated, which is not illustrated. Two similar servo valves, namely a main servo valve 18 and a standby servo valve 19, are mounted on the top of the jack body 11 with their valve stems by which the valves are actuated protruding parallel to the axis of the jack plunger 12 as shown respectively at 20 and 21. The ends 24 and 25 of the two servo valve actuating stems 20 and 21 are both pivoted to spaced points of a single input lever 26 whose end 27 is pivoted to an input control rod 28 of the pilot's manual control linkage indicated generally at 29 in Figure 2. The manual control linkage 29 comprises a control stick 30 in the pilot's cockpit having a handle 31 at one end and being pivoted about a horizontal axis at 32 intermediate in its length to an anchorage in the cockpit. The lower end 33 of the control stick 30 is pivoted to a linkage 34 running from the cockpit to the region of the flying control member to be actuated, and the end member 35 of the linkage 34 is itself pivoted to a rocking lever 36 mounted on the pin 14 by which the jack plunger 12 is secured to its anchorage, the other end of the lever 36 being pivoted to the input control rod 28.

Thus, for normal operation of the jack 10 by the main servo valve 18, the pivot 25 of the input lever 26 to the standby valve stem 21 serves as the fulcrum for the rocking of the input lever 26 to transmit a given movement of the input control rod 28 to the operating stem 20 of the main servo valve 18. Such movement opens the main servo valve 18 to actuate the jack 10, causing the jack body 11 to move the flying control member in the same direction until the follow-up movement of the main valve 18 on the jack body 11 causes the valve 18 to close itself again and stop the jack 10. Similarly, movement of the input control rod 28 in the opposite direction rocks the input lever 26 in the reverse direction about the fulcrum provided by its pivot 25 to the standby valve stem 21, to move the main valve stem 20 in the corresponding direction, thereby causing the main valve 18 to operate the jack 10 in the reverse direction until the follow-up movement of the valve 18 closes the valve and stops the jack again. To prevent lost motion in the valve operation, the standby servo valve 19 is locked when not in use by means of a hydraulic lock to be described later, so that its valve stem 21 provides a firm fulcrum for the input lever 26.

When it becomes necessary to change over to use of the standby pressure system under control of the standby valve 19, due to failure of the main pressure system, the standby valve is automatically unlocked and the main valve 18 is automatically locked in its closed position, by means to be described later, so that the pivot 24 at the end of the main valve stem 20 now provides the fulcrum for pivotal movement of the input lever 26 to actuate the valve stem 21 of the standby servo valve 19 so that the latter will control the movement of the jack 10.

As shown diagrammatically in Figure 3, the two servo valves 18 and 19 are contained in a common valve body 40 integral with or mounted on the jack body 11, each servo valve comprising a valve piston 41 or 42 mounted on the valve stem 20 or 21, and a hydraulic lock 43 or 44 for the valve stem 20 or 21, each lock being actuated by the pressure of the hydraulic fluid supply to the other valve. Each servo valve is constructed generally in accordance with United States Patent No. 2,560,841, granted July 17, 1951, having a circular, axially telescopic piston 41 or 42 slidably mounted in a circular valve chamber 45 or 46, the axes of the circular pistons 41, 42 and of the circular valve chambers 45, 46 being transverse to the longitudinal axes of the valve stems 20, 21 which carry the pistons. A pressure-responsive hydraulic change-over valve 48 is also provided in the casing 40 to control communication between the two servo valves 18 and 19 and the cylinder of the jack 10. Each servo valve is also provided with an associated electrohydraulic solenoid-operated shuttle valve 49 or 50 which controls, inter alia, the application of the supply pressure to the hydraulic lock of the other servo valve.

Thus, the main servo valve 18 is provided on its piston 41 with wide recesses 51 interconnected by a central passage 52, one of the recesses 51 being in communication with a main pressure inlet port 53 in the valve casing 40 which is connected to the main supply of pressure fluid by a line 54 (see also Figure 4). The valve casing 20 also affords two pressure fluid delivery ports 55 and 56 communicating through conduits leading, via the change-over valve 48, to passages 57 and 58 connected to the inlet ports of the jack cylinder disposed one on either side of the jack piston. Two lands 59 and 60 on the main servo valve piston 41, one on either side of the recesses 51, normally cover and close the delivery ports 55 and 56 when the valve 18 is centralised in its closed position, but when the valve stem 20 is moved by the input lever 26 in one direction or the other, the corresponding delivery port 55 or 56 is uncovered and placed in communication with the recesses 51 and hence with the main pressure inlet port 53 so that pressure fluid from the main supply flows through the servo valve 18 to the appropriate jack inlet passage 57 or 58 and moves the jack body 11 in the corresponding direction in accordance with movement of the input rod 28. The main pressure inlet port 53 always remains uncovered by the piston 41 of the valve, as does a main static pressure delivery port 62 which is normally connected by a conduit 63, 64 via the main solenoid-actuated shuttle valve 49 to a main pressure chamber 65 at one end of the change-over valve 48. The main shuttle valve 49 comprises a valve member having a needle at either end and being movable longitudinally in a valve bore 66 formed with valve seats 67, 68 in either end. The main shuttle valve 49 is normally biased to an open position shown in Figure 3 in which it places the conduit 63 in communication with the conduit 64 leading to the main pressure chamber 65, and closes a return passage 69 leading via the valve chamber 45 of the main servo valve 18 to a main return port 70 to which fluid seeping past the main valve piston 41 drains and is returned to the main reservoir 73 via a return line 72. With the shuttle valve in its normally open position as illustrated, the main supply pressure is applied via the conduit 63, 64 to the main pressure chamber 65, and as the hydraulic lock 44 of the standby valve 19 is connected to the main pressure chamber 65 the standby valve 19 will be locked thereby so long as the pressure in the chamber 65 remains above a certain predetermined value. When the solenoid of the main shuttle valve 49 is energised, it moves the valve shuttle into its other position in which it closes the conduit 63 to shut off the main supply pressure to the chamber 65, and at the same time it connects the conduit 64 leading from the chamber 65 to the return passage 69 to relieve the pressure in the chamber 65, thus releasing the hydraulic lock 44 associated with the standby servo valve 19.

The standby servo valve 19 is similar in construction to the main servo valve 18 and is similarly provided with a co-operating standby pressure inlet port 75 which supplies pressure fluid from a line 76 in the standby pressure system to either of two delivery ports 77 and 78, which lead via the change-over valve 48 to the jack inlet passages 57 and 58 respectively. A second pressure chamber, referred to as the standby pressure chamber 80, is situated in the valve casing 40 at the other end of the change-over valve 48 and is connected permanently by a conduit 81 to the standby pressure inlet port 75 via the central passage 82 in the standby valve piston 42, so that the pressure of the standby system is always exerted within the standby pressure chamber 80. A passage 83 leads from the standby pressure chamber 80 to one normally closed valve seat 84 of the standby electrohydraulic shuttle valve 50, the passage 83 being normally closed by the valve 50, whilst a normally open valve seat 85 at the other end of the shuttle valve 50 connects a passage 86 leading from the hydraulic lock 43 associated with the main servo valve stem 20, to a return conduit 87 leading to the return port 88 and return line 89 of the standby pressure system, so that the hydraulic lock 43 associated with the main servo valve 18 normally remains in its released position. When the standby electro-hydraulic shuttle valve 50 is operated by the energisation of its solenoid however, the shuttle valve moves over to its alternative position to close the valve seat 85 and to shut off the passage 86 from the return conduit 87, and to connect the passage 86 instead to the standby pressure chamber 80 via the now open valve seat 84, so that the pressure of the standby system is applied to the hydraulic lock 43 causing the lock to lock the main servo valve 18 in its closed position.

The change-over valve 48 operates under the resultant force of the two pressures applied to its opposite ends which are exposed to the main and standby pressure chambers 65 and 80. Thus the change-over valve 48 is provided at one end with a piston 90 in a cylinder 91 exposed to the main pressure chamber 65, and at the other end with a second piston 92 of smaller area in a correspondingly smaller cylinder 93 exposed to the standby pressure chamber 80. The areas of the two pistons 90 and 92 are so chosen that normally the resultant force due to the pressure of the main system in the main pressure chamber 65 overcomes that applied at the other end of the valve 48 by the standby pressure in the standby pressure chamber 80, thus keeping the change-over valve 48 in its normal working position as shown in Figure 3 in which the main delivery ports 55 and 56 associated with the main servo valve 18 are in communication with the jack inlet passages 57 and 58 leading to the jack cylinder, whilst the inlet passages 77 and 78 associated with the standby servo valve 19 are shut off from the jack inlet passages 57 and 58 by lands 95 and 96 formed on the stem of the change-over valve 48. If however the pressure in the main pressure chamber 65 falls below a predetermined value, for example half that of the standby pressure, due to failure of the main supply system, the pressure in the standby chamber 80 overcomes that in the main pressure chamber 65 and moves the change-over valve 48 towards the right in Figure 3 into its standby position, in which the lands 95 and 96 shut off the delivery ports 55 and 56 of the main servo valve 18 from the jack inlet passages 57 and 58 but place the delivery ports 77 and 78 of the standby servo valve in communication with the jack inlet passages 57 and 58, thereby changing over the jack to operation by the standby pressure supply system under the control of the standby valve 19.

The change-over movement of the change-over valve 48 in the direction from left to right in Figure 3 is also caused to energise automatically the solenoids of the two electro-hydraulic shuttle valves 49 and 50, causing the valves to move over from the positions shown in Figure 3 into their alternative positions, so that the hydraulic lock 44 of the standby servo valve 19 is automatically released thereby, if the main supply pressure has not already fallen sufficiently low to achieve this, and the hydraulic lock 43 associated with the main servo valve 18 is automatically locked to provide a firm fulcrum at the end 24 of the valve stem 20 for actuation of the standby servo valve 19 by the input lever 26 in response to movements of the pilot's control mechanism 29. For this purpose the moving member of the change-over valve 48 carries at its right hand end in Figure 3 a protruding rod 98 which extends through the wall of the valve casing 40. A micro-switch 99 is positioned on the outside of the valve casing 40 to be engaged and operated by the initial longitudinal movement of the protruding rod 98 when the change-over valve 48 starts to change over towards its right-hand position on failure of the pressure in the main system, and the closing of the micro-switch 99 effected thereby causes the solenoids of the two shuttle valves 49 and 50 to be electrically energised. As a result the shuttle valve 49 moves towards the right in Figure 3 to shut off the passage 64 from the passage 63, thereby shutting off the main pressure chamber 65 from the inlet port 53 associated with the main pressure system, and placing the chamber 65 in communication with the main return passage 69 leading to the return line 72, thereby relieving any residual pressure in the main pressure chamber 65. This has the effect of immediately releasing the hydraulic lock 44 associated with the standby servo valve 19, freeing the latter to take over the duty of controlling the jack 10. At the same time the shuttle valve 50 associated with the standby servo valve moves towards the left in Figure 3 to connect the standby pressure inlet passage 81 to the hydraulic lock 43 associated with the main servo valve 18, thereby locking the latter in its centralised position so that the end 24 of its stem 20 will provide a firm fulcrum for the pivoting of the input lever 26.

The construction of each of the hydraulic locks 43 and 44 is identical, and that of the lock 44 only will now be described. A pair of telescopic piston sleeves 100, 101 surround the valve stem 21, the sleeves sliding in a cylinder 102 formed in the bore of the valve casing 40 which houses the standby valve 19. Each sleeve is provided with a radial flange 104 at its outer end constituting a piston which is a sliding fit in the cylinder 102, and at its inner end slides telescopically over or within the inner end of the co-operating sleeve. The valve stem 21 is formed with a pair of circumferential shoulders 105 and 106 spaced apart a distance corresponding to the distance between the inwardly projecting shoulders that define the two ends of the cylinder 102 in the valve bore. The circumferential shoulders 105, 106 of the valve stem 21 limit the longitudinal sliding movements of the sleeves 100 and 101 relatively to the valve stem 21, whilst the fixed shoulders afforded by the ends of the cylinder 102 limit the longitudinal movements of the sleeves relatively to the valve casing 40. Sealing washers are provided in the circumferential surfaces of the flanges 104 to provide a fluid-tight fit in the cylinder 102, and a sealing washer is also provided between the telescopic inner ends of the sleeves 100 and 101 for the same purpose. The sleeves 100 and 101 are spring-biased toward one another by means of compression springs (not shown) engaging their outer ends, the springs comprising helical springs which surround the valve stem 21 and act inwardly against the outer faces of the flanges 104.

The annular space 107 in the cylinder 102 surrounding the two telescoping sleeves 100 and 101 and between their flanges 104, is placed in permanent communication with the main pressure chamber 65 by a passage 108, so that the annular space 107 will be subjected to whatever hydraulic pressure exists in the chamber 65. When the main system pressure is established in the chamber 65 it acts on the piston flanges 104 of the two sleeves 100 and 101 and forces the sleeves apart until they abutt the stops afforded by the annular shoulders 105, 106 on the valve stem 21 and by the ends of the cylinder 102. Moreover the force of the hydraulic pressure acting on two piston flanges 104 will force them to move the valve stem 21 longitudinally until the two protruding shoulders 105 and 106 are in register with the ends of the cylinder 102, and will lock the valve stem 21 positively in that position, which is arranged to be the centralised closed position of the valve 19. When the pressure applied to the hydraulic lock collapses, due to a fall in pressure in the main pressure chamber 65, the compression springs cause the two sleeves 100, 101 to telescope inwardly one over the other so as to free the valve stem 21 for longitudinal movement.

The construction and operation of the hydraulic lock 43 associated with the stem 20 of the main servo valve 18 is identical with that of the lock 44, except that the lock 43 is actuated in response to the pressure in the passage 86 under the control of the shuttle valve 50.

A manual hydraulic selector control shown at 110 in Figure 4 is provided as an emergency control which enables the change-over from one pressure system to the other to be effected at will. This comprises a manually operated hydraulic change-over valve which when actuated disconnects the main pressure system 111 from the line 54 leading to the inlet port 53 of the main servo valve 18 and connects the system 111 instead to the main return line 72 leading to the reservoir 73, so that in effect the pressure supply of the main system to the main servo valve 18 collapses. As a result of this, the installation changes over automatically, by movement of the change-over valve 48, to supply from the standby system via the standby servo valve 19.

The arrangement also provides fully automatic change-over from the main pressure supply to the standby supply in the event of failure of the main supply pressure, so that the change-over to the standby system will not jeopardise the safety of the aircraft by embarrassing the pilot at a possibly critical moment such as take-off, as might be the case if change-over could only be effected manually. Moreover the arrangement introduces no bias in the control run at the moment of automatic change-over from one pressure system to the other. Directly the pressure of the main supply falls below the critical value, for example approximately half the maximum line pressure, the change-over valve 48 moves across under the force of the standby pressure in the chamber 80, and immediately closes the micro-switch 99 to actuate the electro-hydraulic shuttle valves 49 and 50 by which the standby valve stem 21 is automatically unlocked and the main valve stem 20 is automatically locked by its associated hydraulic lock. Moreover the change-over movement of the valve 48 immediately isolates the main servo valve 18 from the jack and puts the standby servo valve 19 into communication with the jack. Thus the non-operative servo valve is isolated from the jack at all times, thereby avoiding any interaction between the two valves. The hydraulic locks provide a firm fulcrum at all times for the pivoting of the input lever 26, whichever servo valve may be operating, thus preventing lost motion and avoiding the necessity for duplication of the input linkage to the two valves.

The system also operates effectively in the event of mechanical failure or seizure of one of the servo valves, but in that case the change-over is effected manually by the pilot by means of his canual selector control 110, the operation of which simulates a pressure failure of the main supply system to the servo valve 18. The provision of the emergency control 110 also takes account of the possibility that a seizure or break-down of one of the servo valves 18 and 19 might coincide with a total electrical failure, since in that case the change-over valve 48, being pressure-actuated, would change over to the other pressure system nevertheless on operation of the emergency manual selector control 110. The electro-hydraulic shuttle valves 49 and 50 would not operate in those circumstances, so that the non-operative servo valve would not be locked after change-over. This would introduce some lost motion into the pilot's manual control linkage which actuates the operative servo valve, but nevertheless complete loss of control would be avoided.

Moreover if a pressure failure in the main pressure system should happen to coincide with a total failure of electric power, the automatic change-over to the standby system by means of the pressure-responsive change-over valve 48 would still be effected automatically, although again the non-locking of the non-operative servo valve might introduce limited lost motion into the input linkage.

To guard against any possibility of the failure of either of the hydraulic locks 43 and 44 to collapse when its locking pressure is released, due to freezing of the pressure fluid, the locks are so designed that there will be a continuous flow of pressure fluid through each lock.

A visual warning device 114 is located in the pilot's cockpit to indicate to the pilot when the automatic change-over to the standby system takes place. The device 114 comprises an electric indicator lamp which as illustrated in Figure 4 is connected in the electric circuit by which the solenoids of the shuttle valves 49 and 50 are operated. Thus as illustrated in Figure 4, the solenoids 115 and 116 of the two shuttle valves 49 and 50 are supplied in parallel by an electric lead 118, the indicator light 114 being connected in a parallel earthed lead 117. The leads 117 and 118 are connected to a common supply conductor 119 connected via a manual selector switch 120 to the line 121 from the aircraft electric supply. The switch 120 is also arranged to be operated electromagnetically by means of a relay 122 whose solenoid may be energised either by the closing of the micro-switch 99 associated with the changeover valve 48, or by the closing of a micro-switch 123 which is built into a spring-box 124 constituting a load sensing device incorporated as shown in Figure 2 between the links 34 and 35 of the pilot's manual control linkage. Thus the closing of the micro-switch 99 due to movement of the change-over valve 48 to its right hand position in Figure 3 to select the standby system, will automatically cause the relay 122 to close the switch 121 and energise the solenoids 115 and 116 of the two shuttle valves 49 and 50, causing the locking of the hydraulic lock 43 associated with the main servo valve 18 and the release of the lock 44 associated with the standby valve 19. Moreover in the event of valve seizure the pilot, by applying a manual overload to the input linkage 29 through his control handle 31, can close the micro-switch 123 in the spring box 124 and thereby actuate the relay 122 to cause the energising of the shuttle valves 49 and 50 so as to release the hydraulic lock associated with the one valve and to lock that associated with the other valve. In all these cases, the electric indicator lamp 114 provides a visual indication to the pilot that the solenoids of the shuttle valves 49 and 50 have been energised and that the change-over to the standby system has been effected.

A feature of the arrangement described is that both the main and the standby pressure systems may be brought into operation alternatively at will by push-button selection, using the pilot's manual selector switch 120 or the hydraulic selector valve 110. This enables the "pre-flight" serviceability of both systems to be easily ascertained without any need for the subsequent resetting of tripping-type change-over devices.

Where the two pressure fluid systems are separated only by displacement-type valves, some possibility of undesirable interaction between the systems must exist. This hazard may be safeguarded against by interconnecting the system reservoirs above the normal fluid level line. Thus as illustrated in Figure 4, the reservoir 73 associated with the main hydraulic system is connected to the reservoir 130 of the standby system by a communicating passage 131 which as indicated in the diagram is above the liquid level 132 of both reservoirs.

The selection of the two pressure systems to be designated as main and standby is dependent on the type of aircraft. In the present embodiment which relates to helicopters, two sources of hydraulic pressure are already available, namely a pressure system energised by engine-driven hydraulic pumps, and an alternative system energised directly by the rotor head. In the present embodiment the pressure system actuated from the rotor head is used as the main supply of pressure fluid, indicated diagrammatically at 133 in Figure 4. Thus a pump 134 driven by the rotor head is used to supply pressure fluid to a pressure vessel 135 connected to the main pressure line 111, accumulator 136 being also connected to the line 111.

The return line 72 is connected to the inlet of the pump 134 as well as to the reservoir 73. The use of a pressure system actuated from the rotor head is considered to be the most satisfactory choice for the main pressure supply as involving less possibility of pressure fluctuations due to the operation of other services, which might inadvertently operate the change-over mechanism. The standby system, indicated diagrammatically at 140 in Figure 4, incorporates pumps 141 and 142 driven by the helicopter engine or engines to pressurise the vessel 143 connected to the standby pressure line 76, an accumulator 144 being also connected to the line 76. The choice of a standby pressure system driven by the helicopter engine or engines has the advantage that standby operations will not be impaired by abnormal return line pressures.

In the embodiment described, the control linkage 29 has been described as being a manually-operated linkage under the control of the pilot. It will be understood however that where an automatic pilot is provided, a suitable connection between the input lever 26 and the automatic pilot would be provided to enable the servo valves to be operated by the automatic pilot in response to signals fed into it, as an alternative to manual control by the human pilot.

Figure 5:
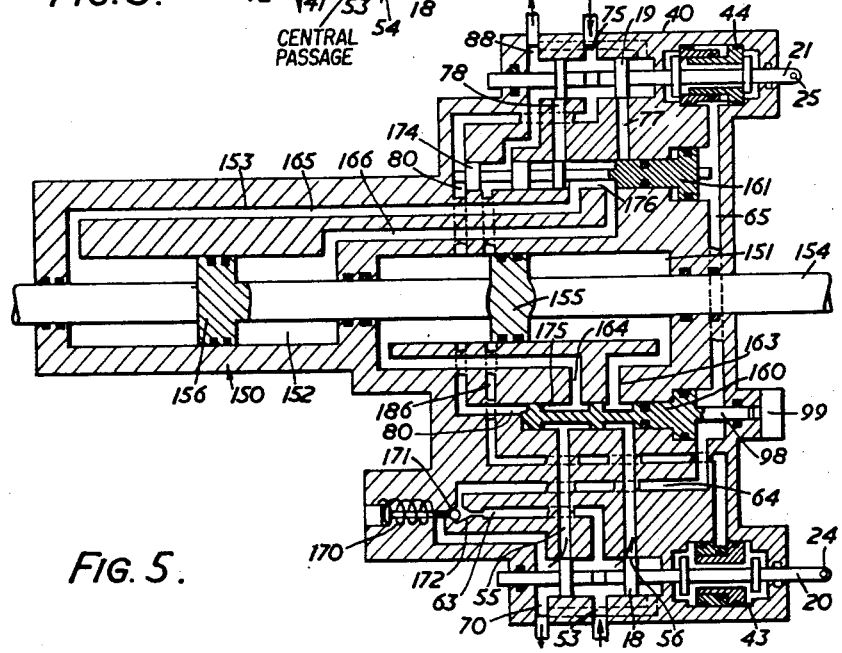

In the modified embodiment illustrated in Figure 5, a hydraulic flying control system generally similar to that of Figures 1 to 4 employs to actuate each flying control surface a tandem jack actuator assembly 150 having two alternative jack cylinders 151 and 152 incorporated in axial alignment within a single jack body 153 which is integral with the valve body 40. The jack 150 has a single jack plunger rod 154 carrying two double-acting pistons 155 and 156 which co-operate respectively with the two cylinders 151 and 152 through both of which the common jack plunger 154 extends. As before, the jack plunger 154 is anchored to a fixed part of the aircraft structure whilst the jack body 153 with the valve casing 40 is coupled to the flying control member to be operated.

The embodiment of Figure 5 is similar in many respects to that described above with reference to Figures 1 to 4, and similar parts will be given the same reference numbers as in that embodiment. Thus the valve casing 40 incorporates a main servo valve 18 controlling the supply of pressure fluid from a main pressure system to the main jack cylinder 151, and a standby servo valve 19 controlling the supply of pressure fluid from a standby pressure system to the standby jack cylinder 152. As before, the valve stems 20 and 21 of the two servo valves are pivoted at their ends 24 and 25 to the input lever of the pilot-actuated input mechanism, so that one valve stem provides a fulcrum for the operation of the other servo valve by the input mechanism. Moreover as before, the two servo valves are provided with hydraulic locks 43 and 44 each arranged to be locked when required by the pressure of the hydraulic system controlled by the other servo valve. Thus the two jack chambers 151 and 152 of the tandem jack 150 are arranged to be supplied alternatively with pressure fluid from the associated main and standby systems, in response to the operation of the associated main or standby servo valve 18 or 19, so that the flying control member can be actuated alternatively from either of the two pressure systems acting through its associated servo valve and the associated jack chamber, but both servo valves are never operated simultaneously to energise both jack chambers at the same time.

In the present embodiment however, the pressure-responsive change-over valve means, instead of being afforded by a single change-over valve such as the valve 48 of the preceding embodiment, in this case constitutes two pressure-responsive change-over valves which will be referred to as the main isolating valve 160 and the standby isolating valve 161. Both isolating valves are exposed at their larger ends to the main system pressure in the main pressure chamber 65 which also communicates with the hydraulic lock 44, and at their smaller ends are subjected to the standby system pressure in the standby chamber 80 which remains connected to the standby inlet port 75. Thus the two isolating valves are normally biassed to their left-hand positions as seen in Figure 5 in which the isolating valve 160 affords communication between the two main delivery ports 55 and 56 controlled by the main servo valve 18 and the jack inlet passages 163 and 164 leading to the main jack chamber 151 on opposite sides of the piston 155, so that the jack chamber 150 will be actuated in response to movements of the servo valve 18; and in which the isolating valve 161 shuts off the standby pressure delivery ports 77 and 78 from the jack inlet passages 165 and 166 leading to the standby jack chamber 152. On failure of the main system pressure in the chamber 65, the two isolating valves move over towards the right in Figure 5 thus isolating the main servo valve 18 from its associated jack chamber 151, and connecting the standby servo valve 19 to its associated standby jack chamber 152 for actuation of the latter from the standby pressure system. In this embodiment, only one solenoid-actuated electro-hydraulic valve 170 is provided whose valve needle is normally biassed to the position shown in Figure 5 in which it closes a valve seat 171 but, when the solenoid is energised, moves towards the right in Figure 5 to open the valve seat 171 and to close a second valve seat 172, thereby connecting the pressure chamber 65 via the passage 64 to the main system return port 70 to relieve the pressure in the chamber 65 and also closing the passage 63 leading from the main valve inlet port 53. The micro-switch 99 which controls the energising of the solenoids of the valve 170 is in this case actuated by a rod 98 mounted on the main isolating valve 160.

Thus the hydraulic lock 44 which normally holds the standby servo valve locked will be released directly as the pressure in the chamber 65 collapses, either on account of a failure of the main system pressure or by virtue of the energising of the solenoid valve 170, and in either case the two isolating valves 160 and 161 will move together towards the right in Figure 5 to their standby positions. The normally released hydraulic lock 43 associated with the main servo valve 18 is however controlled by a land 174 carried by the standby isolating valve 161 which, when the valve 161 moves over to its right-hand or standby position, closes communication between the passage 86 leading to the lock 43 and the standby return port 88, and connects the passage 86 instead to the standby pressure chamber 80 so that the pressure of the standby system is applied to the lock 43 to cause it to lock the main servo valve in its centralised position.

In order that the idle jack chamber and jack piston shall not hydraulically jam the tandem jack 150 whilst the other jack chamber is in operation, each of the jack chambers 151 and 152 is provided with a hydraulic by-pass afforded by a wide groove 175 or 176 formed in the plunger of the associated isolating valve 160 or 161 between the lands which control the delivery ports of the associated servo valves 18 and 19. The dimensions and position of each of the wide grooves 175 and 176 is such that when, for example, the isolating valve 161 is in its isolating position, as shown in Figure 5, the groove 176 bridges the mouths of the two inlet passages 165 and 166 leading to the associated jack chamber 152, so that both sides of the jack chamber 152 are connected together and fluid can pass from one side to the other of the jack piston 156, thereby enabling the jack piston to be moved freely in the chamber 152 so that it will not oppose the movement of the jack plunger 154 and the actuation of the flying control member by the other jack chamber 151, whose inlet passages 163 and 164 are not bridged by the groove 175 of the isolating valve 160 but are connected respectively to the delivery ports of the servo valve 18. Similarly when the two isolating valves 160 and 161 change over to their standby positions, the wide groove 175 of the valve 160 bridges the inlet passages 163 and 164 of the main jack chamber 151 whilst the standby jack chamber 152 is being actuated by the standby pressure in response to movement of the standby servo valve 19.

It will be observed that when the standby isolating valve 161 is in its isolating position in which the wide groove 176 bridges the passages 165 and 166 leading to the standby jack chamber 152, as shown in Figure 5, the inlet port 77 leading from the servo valve 19 is completely closed by the isolating valve 161 but the other inlet port 78 is arranged to overlap very slightly with the wide groove 176 so as to connect the hydraulic by-pass to the drainage return 88, the servo valve 19 being locked in a slightly off-centre position for this purpose, so that the circulation of fluid from the inoperative standby pressure system is permitted as a safeguard against temperature fluctuations. When the isolating valve 161 is moved to its other, non-isolating position the wide groove 176 acts as the channel between the uncovered inlet port 79 and the associated inlet passage 166 of the jack chamber.

In other respects the embodiment of Figure 5 is similar in its construction and operation to that of Figures 1 to 4 and will not be further described herein.

Whilst in the embodiment of Figure 5 the use of tandem jacks has been described, it will be clear that two separate jack units may be employed instead of the single tandem jack assembly. In such a case each of the two jack units would be similarly provided with an associated hydraulic by-pass in its associated isolating valve, to prevent it jamming the flying control when the other jack and pressure system are in operation. Alternatively a manual lost-motion connection would be provided between the flying control and the two jacks, such as a rocking differential lever to which the jacks and the flying control would be pivoted at points spaced along its length.

The third embodiment of the invention employs a modified jack and valve assembly as illustrated in Figure 6, but is similar in most other respects to that of Figures 1 to 4, similar parts being given the same reference numerals. The actuator assembly of Figure 6 employs a single jack 10 whose jack plunger 12 carries a single double-acting piston 180 within the single jack cylinder 131, the jack body 11 affording an integral housing for the main and standby servo valves 18 and 19, whose construction and arrangements is similar to that of Figures 1 to 4 and which are respectively provided with hydraulic locks 43 and 44 enabling the inoperative valve to afford a fulcrum 24 or 25 for the rocking of the input lever 26 to operate the unlocked valve. As in the arrangement of Figures 1 to 4, a single changeover valve 48 is provided whose larger end is subject to the pressure of the main system in the main pressure chamber 65 and whose smaller end is subject to the pressure of the standby system in the standby pressure chamber 80, so that normally the valve 48 will be retained by the pressure in the main chamber 65 in its left hand position as shown in Figure 6, in which it isolates the standby servo valve 19 from the jack inlet passages 57 and 58 but connects the main servo valve 18 to those passages for actuation of the jack thereby. On collapse of the main pressure in the chamber 65 however, the valve 48 is automatically moved to its right hand position to isolate the main servo valve 18 and to connect the standby valve 19 to the jack inlet passages 57 and 58 for actuation of the jack from the standby system.

In this embodiment however no electro-hydraulic shuttle valve is provided for initiating at will the changeover from one pressure system to the other, and such change-over is effected solely in response to the collapse of pressure in the main pressure chamber 65 which causes the change-over valve to move over to its right-hand position. The change-over from one pressure system to the other can however be initiated at will by the pilot by the use of his manual hydraulic selector control 110, similar to that shown in Figure 4, by which the pressure of the main system is switched from the normal inlet line 54 to the normal return line 72, thus simulating the failure of pressure in the main system and causing the collapse of the pressure in the pressure chamber 65.

In the present embodiment moreover the main pressure chamber 65 is permanently connected via the passage 64 to the main pressure inlet port 53 by the transverse bore 52 in the main servo valve 18, whilst the change-over valve 48 is provided with an additional land 185 which in combination with its small-end piston 92 serves to control the hydraulic locks 43 and 44 on the servo valve stems 20 and 21. Thus with the change-over valve in its normal left hand position as illustrated in Figure 6, with the lock 44 held locked by the fluid pressure of the main system existing in the chamber 65, the passage 86 leading to the lock 43 associated with the main valve is put into communication with the standby return port 88 to ensure that the lock 43 is relieved of pressure and remains released. The passage 86 leads into the annular space 186 between the lands 92 and 185 on the change-over valve 48, into which space leads also the passage 87 which is connected, via the return by-pass of the standby valve 19, with the return port 88. When the pressure in the main pressure chamber 65 collapses however, allowing the changeover valve 48 to be moved over towards the right into its standby position by the standby pressure in the chamber 80, the piston 92 passes across the mouth of the passage 86 putting the latter into communication with the passage 81 so that the standby pressure is applied to the main hydraulic lock 43 to cause it to lock the main valve 18, and the piston 92 moves into a position in which it covers and closes the mouth of the return passage 87. At the same time the lands 185 and 96 cover the delivery passages 55 and 56 from the main valve 18 so as to isolate the latter from the jack 10.

As mentioned above, the embodiment of Figure 6 differs from that of Figures 1 to 4 in that no electric control circuits and no electro-hydraulic shuttle valves are provided. The main and standby hydraulic systems and their associated hydraulic circuits however, which are connected to the jack and valve assembly of Figure 6, are similar to those of the embodiment of Figures 1 to 4 and the general method of operation and control of the system is again generally similar to that of the previous embodiment referred to and will not be further described.

What I claim as my invention and desire to secure by Letters Patent is:

1. A hydraulic-powered aircraft flying control system, which comprises a flying control member actuated by hydraulic motor means arranged to be supplied from either of two alternative hydraulic pressure systems, referred to respectively as the main system and the standby system, through two hydraulic servo valves, referred to respectively as the main valve and the standby valve, and respectively associated with the two pressure systems, and a common control mechanism for operating the valves, means for establishing an operative connection between the control mechanism and either of the servo valves for operation of that valve by the mechanism, and means for automatically transferring the operative connection of the mechanism from the main valve to the standby valve on failure of the main hydraulic pressure supply to the main valve, said control mechanism comprising a linkage including an input lever pivoted to the operating members of both servo valves at points spaced apart along its length and also pivoted at a third point to the linkage, the lever pivoting about a fulcrum afforded by its pivotal connection to the standby valve to operate the main valve in response to movement of the linkage when the operative connection of the control mechanism is made to the main valve, and pivoting about a fulcrum afforded by its pivotal connection to the main servo valve for operation of the standby valve in response to the movement of the linkage when the operative connection is made to the standby valve.

2. A hydraulic-powered aircraft flying control system, which comprises a flying control member actuated by hydraulic motor means arranged to be supplied from either of two alternative hydraulic pressure systems, referred to respectively as the main system and the standby system, through two hydraulic servo valves, referred to respectively as the main valve and the standby valve, and respectively associated with the two pressure systems, and a common control mechanism for operating the valves, means for establishing an operative connection between the control mechanism and either of the servo valves for operation of that valve by the mechanism, and means for automatically transferring the operative connection of the mechanism from the main valve to the standby valve on failure of the main hydraulic pressure supply to the main valve, each said valve being provided with a lock arranged when locked to hold the valve positively in a closed position, the lock associated with the main valve normally remaining released whilst that associated with the standby valve is normally held locked, but in which in the event of failure of the main system the standby valve is automatically released and the main valve is automatically locked and held locked.

3. A flying control system as claimed in claim 2 in which the lock associated with each servo valve comprises a hydraulic-pressure-actuated lock, that associated with the standby valve being normally held locked by the pressure of the main system but being automatically released when the pressure of the main system falls below a predetermined value, whilst that associated with the main valve normally remains released but is automatically locked and held locked by the pressure of the standby system when the pressure in the main system falls below the predetermined value.

4. A flying control system as claimed in claim 2 including solenoid-actuated electro-hydraulic valve means arranged when energised to release the normally locked lock associated with the standby valve and to lock the normally released lock associated with the main valve.

5. A flying control system as claimed in claim 4 including a manually-operated switch which when closed causes the energisation of the solenoid-actuated valve means.

6. A flying control system as claimed in claim 4 including a switch arranged to be operated by movement of the common control mechanism in the event of seizure of a servo valve, and serving when so operated to cause the energisation of the solenoid-actuated valve means.

7. A hydraulic-powered aircraft flying control system, which comprises a flying control member actuated by hydraulic motor means arranged to be supplied from either of two alternative hydraulic pressure systems, referred to respectively as the main system and the standby system, through two hydraulic servo valves, referred to respectively as the main valve and the standby valve, and respectively associated with the two pressure systems, and a common control mechanism for operating the valves, means for establishing an operative connection between the control mechanism and either of the servo valves for operation of that valve by the mechanism, and means for automatically transferring the operative connection of the mechanism from the main valve to the standby valve on failure of the main hydraulic pressure supply to the main valve, said control system further including hydraulic-pressure-responsive valve means normally pressure-biassed to one operative position in which it isolates the standby servo valve from the jack means, but arranged to move automatically into an alternative operative position, in which it establishes connection between the standby valve and the jack means but isolates the main valve from the jack means, when the pressure supply from the main system falls below a predetermined value.

8. A flying control system as claimed in claim 2 including hydraulic-pressure-responsive change-over valve means normally pressure-biassed to one operative position in which it isolates the standby servo valve from the jack means, but arranged to move automatically into an alternative operative position, in which it establishes connection between the standby valve and the jack means but isolates the main valve from the jack means, when the pressure supply from the main system falls below a predetermined value, and in which the change-over movement of the change over valve means from its normal operative position to its alternative operative position is arranged to release the normally locked lock associated with the standby valve and to lock the normally released lock associated with the main servo valve, and vice versa.

9. A flying control system as claimed in claim 2 including hydraulic-pressure-responsive change-over valve means arranged when energised to release the normally locked lock associated with the standby valve and to lock the normally released lock associated with the main valve, and including solenoid-actuated electro-hydraulic valve means arranged to be energised automatically in response to the change-over movement of the pressure-responsive change-over valve means into its alternative operative position and arranged when so energised to release the normally locked lock associated with the standby valve and to lock the normally released lock associated with the main valve.

10. A flying control system as claimed in claim 9 including a manually-operated switch which when closed causes the energisation of the solenoid-actuated valve means.

11. A flying control system as claimed in claim 9 including a switch arranged to be operated automatically by movement of the common control mechanism in the event of seizure of a servo valve, and serving when so operated to cause the energisation of the solenoid-actuated valve means.

12. A flying control system as claimed in claim 8 including a hydraulic selector control connected in the main pressure system and arranged when operated to reduce the main supply pressure at the main servo valve to less than the predetermined critical value required to cause the change-over movement of the pressure-responsive change-over valve means.

13. A hydraulic-powered aircraft flying control system, which comprises a flying control member actuated by hydraulic motor means arranged to be supplied from either of two alternative hydraulic pressure systems, referred to respectively as the main system and the standby system, through two hydraulic servo valves, referred to respectively as the main valve and the standby valve, and respectively associated with the two pressure systems, and a common control mechanism for operating the valves, means for establishing an operative connection between the control mechanism and either of the servo valves for operation of that valve by the mechanism, and means for automatically transferring the operative connection of the mechanism from the main valve to the standby valve on failure of the main hydraulic pressure supply to the main valve, said hydraulic motor means comprising a single hydraulic jack supplied alternatively from the main and standby systems through the associated servo valves.

14. A hydraulic-powered aircraft flying control system, which comprises a flying control member actuated by hydraulic motor means arranged to be supplied from either of two alternative hydraulic pressure systems, referred to respectively as the main system and the standby system, through two hydraulic servo valves, referred to respectively as the main valve and the standby valve, and respectively associated with the two pressure systems, and a common control mechanism for operating the valves, means for establishing an operative connection between the control mechanism and either of the servo valves for operation of that valve by the mechanism, and means for automatically transferring the operative connection of the mechanism from the main valve to the standby valve on failure of the main hydraulic pressure supply to the main valve, said hydraulic motor means comprising a pair of hydraulic jacks both connected to the flying control member, the two jacks being respectively connected to the two pressure systems through the two valves and being actuated alternatively.

15. A flying control system as claimed in claim 14 including a mechanical lost-motion connection between the jacks and the flying control member whereby either jack may be actuated to move the flying control member independently of the other jack.

16. A hydraulic-powered aircraft flying control system, which comprises a flying control member actuated by hydraulic motor means arranged to be supplied from either of two alternative hydraulic pressure systems, referred to respectively as the main system and the standby system, through two hydraulic servo valves, referred to respectively as the main valve and the standby valve, and respectively associated with the two pressure systems, and a common control mechanism for operating the valves, means for establishing an operative connection between the control mechanism and either of the servo valves for operation of that valve by the mechanism, and means for automatically transferring the operative connection of the mechanism from the main valve to the standby valve on failure of the main hydraulic pressure supply to the main valve, said hydraulic motor means comprising a tandem jack having two jack cylinders in a single jack casing both acting on a single jack plunger, the two jack cylinders being respectively connected through the two servo valves to the two pressure systems and being actuated alternatively thereby.

17. A flying control system as claimed in claim 16 in which each jack chamber is provided with a hydraulic by-pass passage arranged to be connected in parallel across the associated jack piston when that jack chamber is inoperative, to maintain equalised pressures on both sides of the jack piston.

References Cited in the file of this patent
UNITED STATES PATENTS

| | | |
|---|---|---|
| 1,955,922 | Lamond | Apr. 24, 1934 |
| 2,597,418 | Westbury et al. | May 20, 1952 |
| 2,597,419 | Westbury et al. | May 20, 1952 |
| 2,597,420 | Westbury | May 20, 1952 |
| 2,613,650 | Mott | Oct. 14, 1952 |
| 2,863,423 | Moll | Dec. 9, 1958 |